(12) United States Patent
Murakami et al.

(10) Patent No.: US 7,165,310 B2
(45) Date of Patent: Jan. 23, 2007

(54) METHOD FOR CONNECTING TWO MEMBERS

(75) Inventors: Fumiyoshi Murakami, Kasugai (JP); Akinori Hoshino, Nisshin (JP); Koichi Sakamoto, Kariya (JP); Noriaki Nonaka, Chiryu (JP); Haruji Suzuki, Sagamihara (JP); Tsuneo Shishido, Hachioji (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 138 days.

(21) Appl. No.: 10/975,990

(22) Filed: Oct. 29, 2004

(65) Prior Publication Data

US 2005/0091831 A1    May 5, 2005

(30) Foreign Application Priority Data

Oct. 30, 2003    (JP)    ............................. 2003-371029

(51) Int. Cl.
*B23P 11/00*    (2006.01)
*F16D 1/072*    (2006.01)
(52) U.S. Cl. .................. 29/505; 29/522.1; 29/521; 29/525.05; 29/525.08; 29/523; 403/274; 403/282
(58) Field of Classification Search .................. 29/505, 29/522.1, 521, 523, 525, 525.05, 525.08; 403/274, 282, 284
See application file for complete search history.

(56) References Cited

U.S. PATENT DOCUMENTS

| | | | | |
|---|---|---|---|---|
| 1,367,134 A | * | 2/1921 | Hachmann | .................. 29/505 |
| 1,638,648 A | * | 8/1927 | Trotter et al. | ................ 416/217 |
| 1,947,839 A | * | 2/1934 | Fissell | .......................... 188/255 |
| 1,989,955 A | * | 2/1935 | Patter | .......................... 403/281 |
| 2,050,993 A | * | 8/1936 | Bush | .............................. 29/521 |
| 2,639,119 A | * | 5/1953 | Greenwald | .................... 416/217 |
| 2,863,185 A | * | 12/1958 | Riedi | .......................... 403/297 |
| 2,899,224 A | * | 8/1959 | Elliott | .......................... 403/274 |
| 2,958,230 A | * | 11/1960 | Gottfrid | ........................ 474/183 |
| 3,093,526 A | * | 6/1963 | Price et al. | .................. 264/154 |
| 3,209,437 A | * | 10/1965 | Voorhies | .................... 29/888.43 |
| 3,341,932 A | * | 9/1967 | Haller | .......................... 29/432 |
| 3,482,865 A | * | 12/1969 | Haller | .......................... 403/282 |
| 5,079,825 A | * | 1/1992 | Matsui et al. | ................... 29/520 |
| 5,121,537 A | * | 6/1992 | Matsui et al. | ............... 29/522.1 |
| 5,244,746 A | * | 9/1993 | Matsui et al. | ................ 428/609 |

FOREIGN PATENT DOCUMENTS

| | | | |
|---|---|---|---|
| JP | 03086331 A | * | 4/1991 |
| JP | 07-096335 | | 4/1995 |
| JP | 2002-364622 | | 12/2002 |
| JP | 2003-080328 | | 3/2003 |

* cited by examiner

*Primary Examiner*—Essama Omgba
(74) *Attorney, Agent, or Firm*—Finnegan, Henderson, Farabow, Garrett & Dunner L.L.P.

(57) ABSTRACT

A connecting structure includes a first member including a hole which has a narrower width at an opening portion than a width at a bottom portion and a projecting portion projected toward the opening portion at the bottom portion of the hole, and a second member with a longer shape than a depth of the hole of the first member wherein the second member is inserted into the hole of the first member, the second member being plastically deformed by pushing the second member into the bottom portion of the first member with pressure.

4 Claims, 6 Drawing Sheets

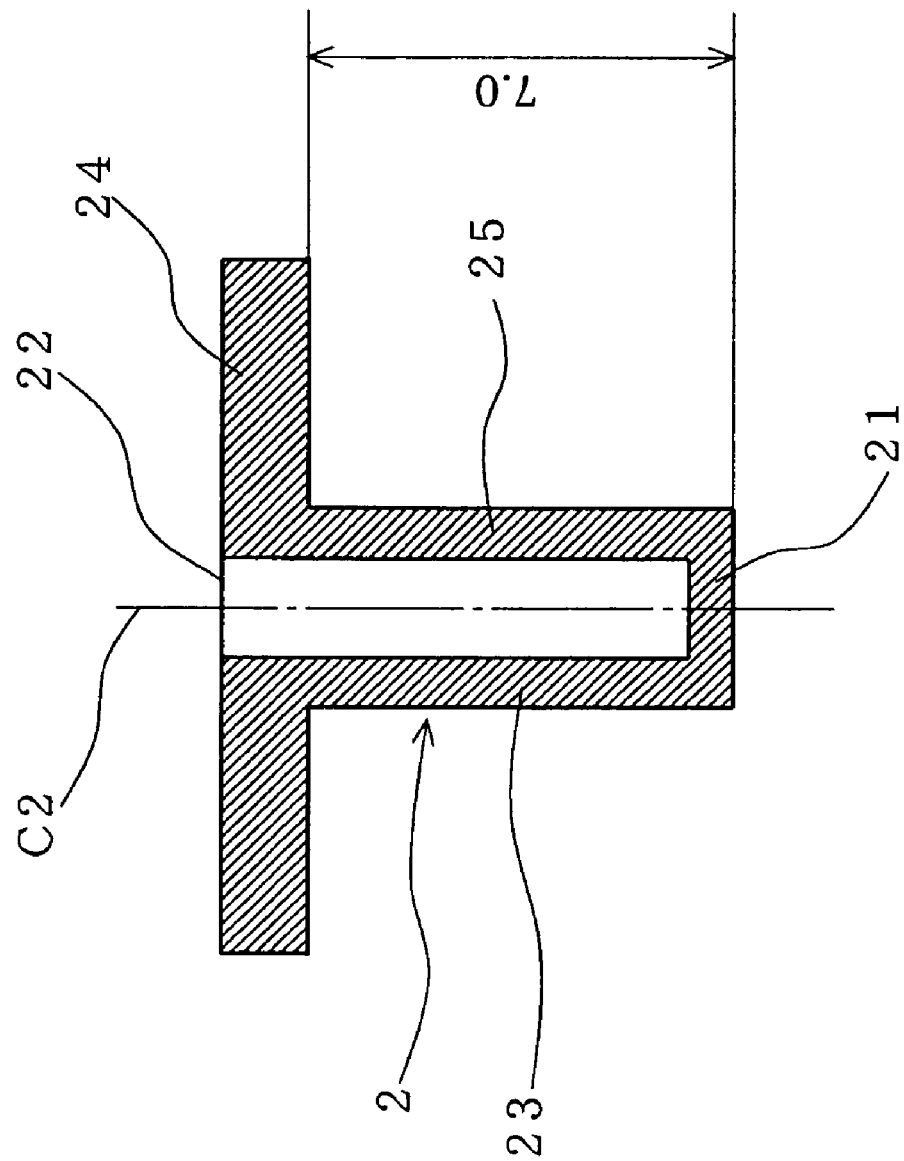

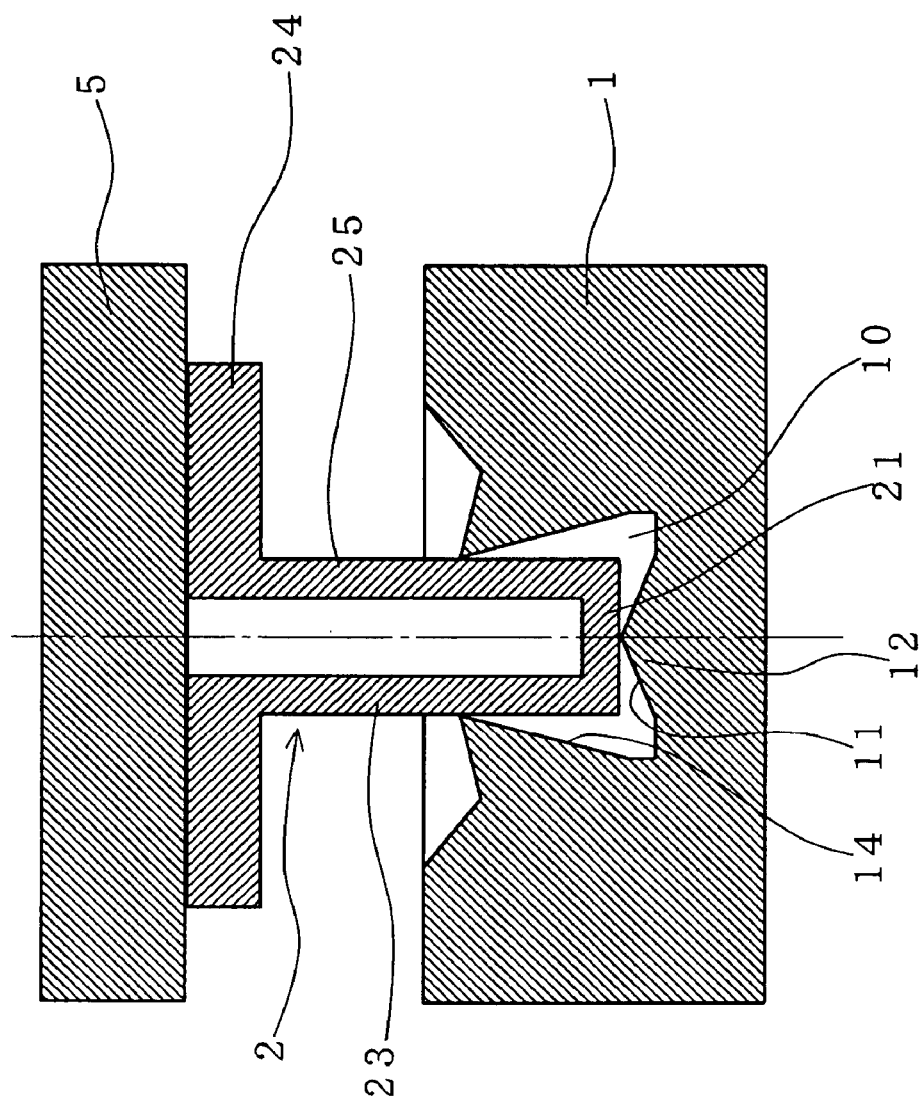

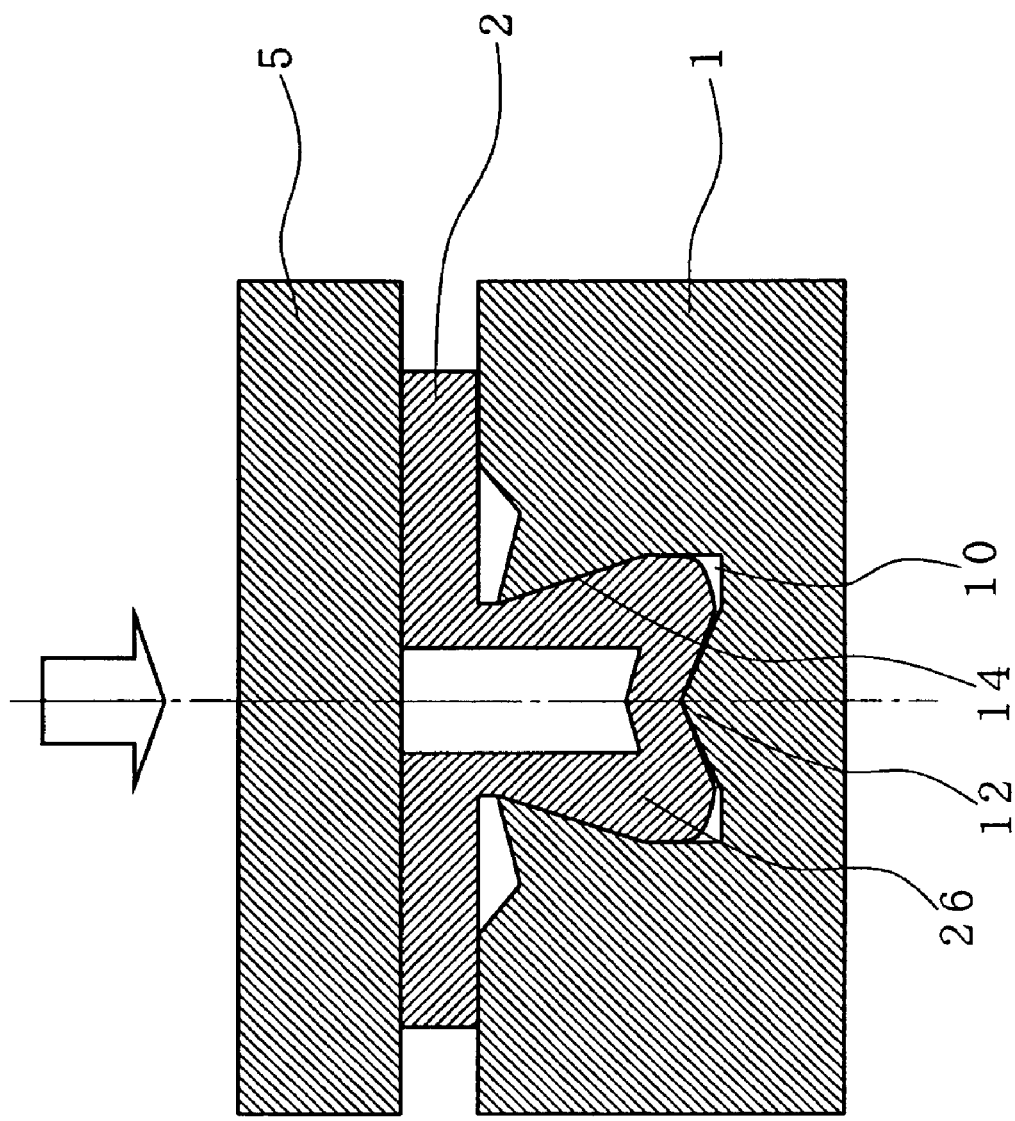

METHOD FOR CONNECTING TWO MEMBERS

CROSS REFERENCE TO RELATED APPLICATIONS

This application is based on and claims priority under 35 U.S.C. § 119 to Japanese Patent Application 2003-371029, filed on Oct. 30, 2003, the entire content of which is incorporated herein by reference.

FIELD OF THE INVENTION

This invention generally relates to method for connecting two members.

BACKGROUND

For connecting methods of two parts, several methods such as a method using a connecting part, a method arranging an excessive portion to connecting intent parts to connect them, and welding method are generally known. These methods have several drawbacks, including increased costs caused by an increased number of parts, increased size caused by adding excessive portions, and deformation of the parts caused by heating.

To achieve easier connecting, a connecting method has been disclosed in JP2002-364622A2. In this document, an attaching member is connected to an attachment base. The attaching member includes a ring-shaped ditch arranged at one side of the attaching member which faces to the attachment base. The distance between both inner walls of the ring-shaped ditch becomes close with the position moved from a bottom to an opening. The attachment base includes a ring-shaped projecting portion corresponding to the ring-shaped ditch.

When the attaching member is connected to the attachment base, the ring-shaped projecting portion is inserted into the ring-shaped ditch, and the ring-shaped projecting portion is plastically deformed by compression force. Then, the attaching member and the attachment base are rigidly connected.

According to this configuration, the thickness of the ring-shaped projecting portion cannot be thick since it has to plastically deform. Therefore, it is difficult to apply the connecting system to parts which have to be connected to each other with high strength. In addition, the ring-shaped projecting portion has an inclined portion at the edge portion to make it easy to deform. In this case, the edge portion of the ring-shaped projecting portion has to be shaped thin. It makes the manufacturing process complicated and the connecting strength is reduced.

SUMMARY OF THE INVENTION

According to an aspect of the present invention, a method for connecting two members includes a preparing step for preparing a first member including a hole which has a narrower width at an opening portion than a width at a bottom portion and a projecting portion projected toward the opening portion at the bottom portion of the hole and a second member with a longer shape than the depth of a hole of the first member; an inserting step for inserting the second member into the hole of the first member; and a pushing step for inserting the second member into the bottom portion of the first member with pressure to deform the second member plastically.

It is preferable that the projecting portion is formed in a conical shape.

It is preferable that the second member is formed in a cylindrical shape and includes a closed end provided at one end of the second member and an open end provided at the other end of the second member. The closed end comes in contact with the projecting portion of the first member when the second member is inserted into the hole of the first member.

It is preferable that the inner wall of the hole tapers gradually from the bottom portion to the opening portion.

It is preferable that a flange is provided at peripheral portion of the opening of the second member.

It is preferable that the first member is shaped from an unprocessed member using a punch, the unprocessed member includes a hole with a projecting portion at a bottom portion thereof and a projecting surface portion is formed along a periphery of the opening portion of the hole so as to project relative to an outer peripheral of the projecting surface portion, one side of the punch is shaped as a truncated cone, having an inverted conical concave portion, an outer diameter of the inverted conical concave portion is larger than an inner diameter of the projecting surface portion and smaller than an outer diameter of the projecting surface portion, and the first member is shaped by forging of the unprocessed member with pushing the projecting surface portion of the unprocessed member using the truncated conical side of the punch.

It is preferable that the opening portion of the first member is provided at the bottom portion side with a predetermined distance from an upper surface of the first member.

It is preferable that the first member is made of a steel material.

It is preferable that the first member is made of one of carbon steel, titanium steel, stainless steel, nickel steel, and chromium steel.

It is preferable that the first member is made of chromium steel.

It is preferable that the second member is made of one of aluminum steel, carbon steel, titanium steel, stainless steel, nickel steel, and high tensile steel.

It is preferable that the second member is made of high tensile steel.

It is preferable that the second member is formed by deep-draw pressing.

It is preferable that the second member has a cylindrical shape with a closed end.

It is preferable that the second member is shaped with a projecting portion for insertion into the hole of the first member is formed on one side of a plate member.

It is preferable that the projecting portion of the second member is formed by deep-draw pressing of the plate member and shaped to have a cylindrical shape with the closing end at one end of the second member.

It is preferable that the projecting surface portion is has a ring shape surrounding the opening portion of the unprocessed member.

It is preferable that outer peripheral of the projecting surface portion has an inclined surface portion.

It is preferable that the hole of the unprocessed member has a cylindrical shape.

BRIEF DESCRIPTION OF THE DRAWINGS

The foregoing and additional features and characteristics of the present invention will become more apparent from the following detailed description considered with reference to the accompanying drawings, wherein:

FIG. 4 is a cross sectional view illustrating a second member according to an embodiment of the present invention;

FIG. 5 is a cross sectional view for explaining connecting process (a condition before connecting) wherein a second member is inserted to a hole of a first member; and FIG. 6 is a cross sectional view for explaining connecting process (a condition after connecting) wherein a second member is deformed to fit a hole of a first member.

DETAILED DESCRIPTION

A preferred embodiment of the present invention will be described hereinbelow in detail with reference to the accompanying drawings.

Figure 1:
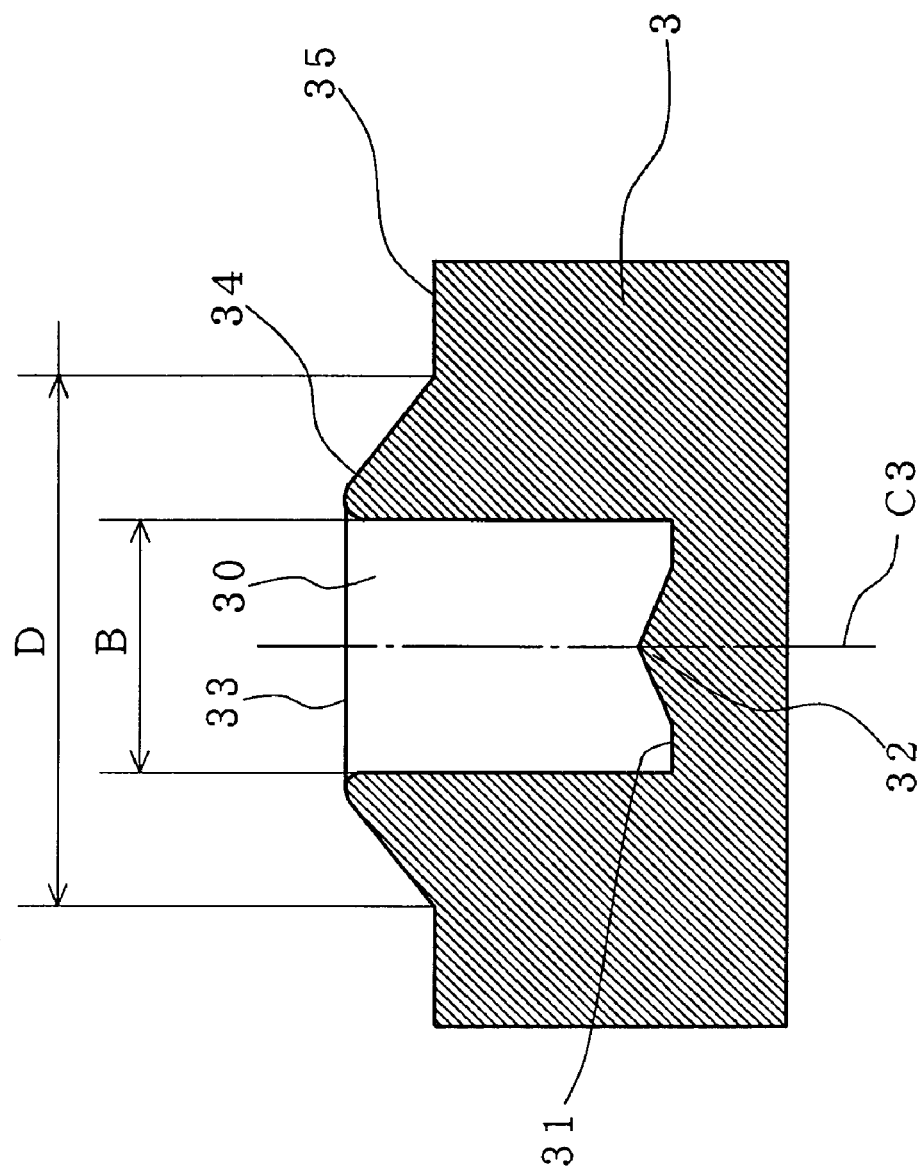
FIG. 1 is a cross sectional view illustrating a substantial part of an unprocessed member of a first member according to an embodiment of the present invention.

FIG. 1 is a cross sectional view illustrating a substantial part of an unprocessed member 3 of a first member 1. The unprocessed member 3 has a plate-like shape, and a peripheral portion of a hole 30 is shown in FIG. 1. A projecting portion 32 is formed at a bottom portion 31 of the hole 30 of the unprocessed member 3. A projecting surface portion 34 is provided so as to surround an opening portion 33 of the hole 30 and to project relative to upper surface 35 of the unprocessed member 3.

In this embodiment, the hole 30 has a cylindrical shape 13 mm in diameter. The projecting portion 32 projected towards the opening portion 33 has a conical shape with a 120-degree apex angle and is approximately 2 mm in height. The top of the projecting portion 32 is placed on a center line C3 of the hole 30. The projecting surface portion 30 has a ring shape surrounding the opening portion 33 wherein an outer side of the projecting surface portion 34 has an inclined surface portion and the top portion of the inclined projecting surface portion 34 is chamfered. The unprocessed member 3 is made of chromium steel SCr20 and the unprocessed member 3 and the hole 30 are formed by forging.

Figure 2:
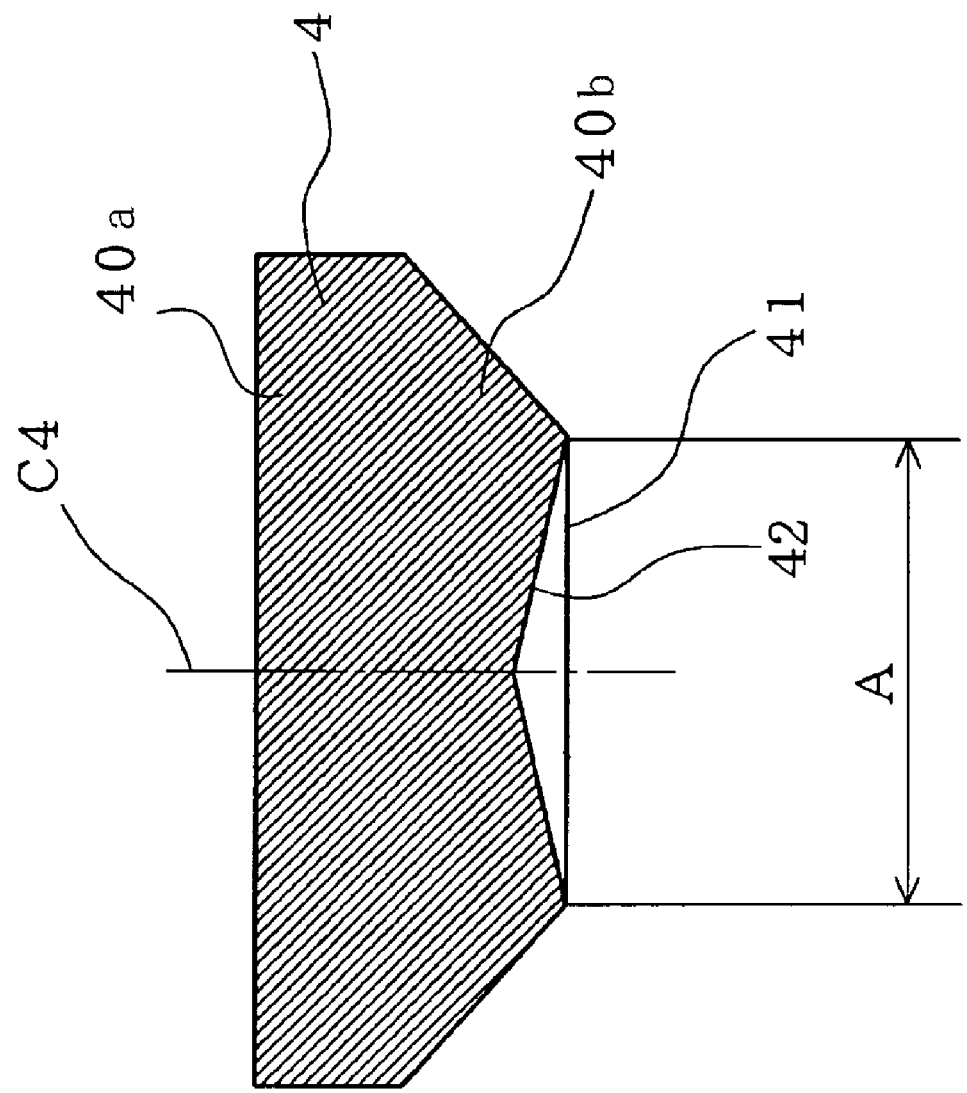
FIG. 2 is a cross sectional view illustrating a punch used to make a first member from an unprocessed member according to an embodiment of the present invention.

FIG. 2 shows a cross sectional view of a punch member 4. An upper side 40a of the punch member 4 is shaped to cylindrical shape and a lower side 40b of the punch member 4 is shaped as a truncated cone having an inverted cone shape concave portion 42 at the lower face 41 of the lower side 40b. An outer diameter A of the inverted cone shape concave portion 42 is larger than an inner diameter B of the projecting surface portion 34 of the unprocessed member 3 and is smaller than an outer diameter D of the projecting surface portion 34.

Next, a shaping process of the first member 1 from the unprocessed member 3 will be explained. The unprocessed member 3 is put on a table of a pressing machine (not shown) wherein the opening portion 33 faces in an upward direction. Also, the punch member 4 is set to the pressing machine so as to face the lower face 41 in a downward direction (direction of the unprocessed member 3). In this condition, the center line C3 and a center line C4 are matched together.

By lowering the punch member 4, an outer diameter of the inverted cone shape concave portion 42 (lower edge of the lower face 41) contacts the projecting surface portion 34 of the unprocessed member. Furthermore, plastic flow (plastic deformation) of the projecting surface portion 34 into inner direction takes place by a pressing force applied by the inverted cone shape concave portion 42. The diameter of the opening portion 33 (an opening portion 13 of the first member 1, explained below) becomes smaller than inner diameter of the hole 30 (a hole 10 of the first member 1, explained below) interior.

Figure 3:
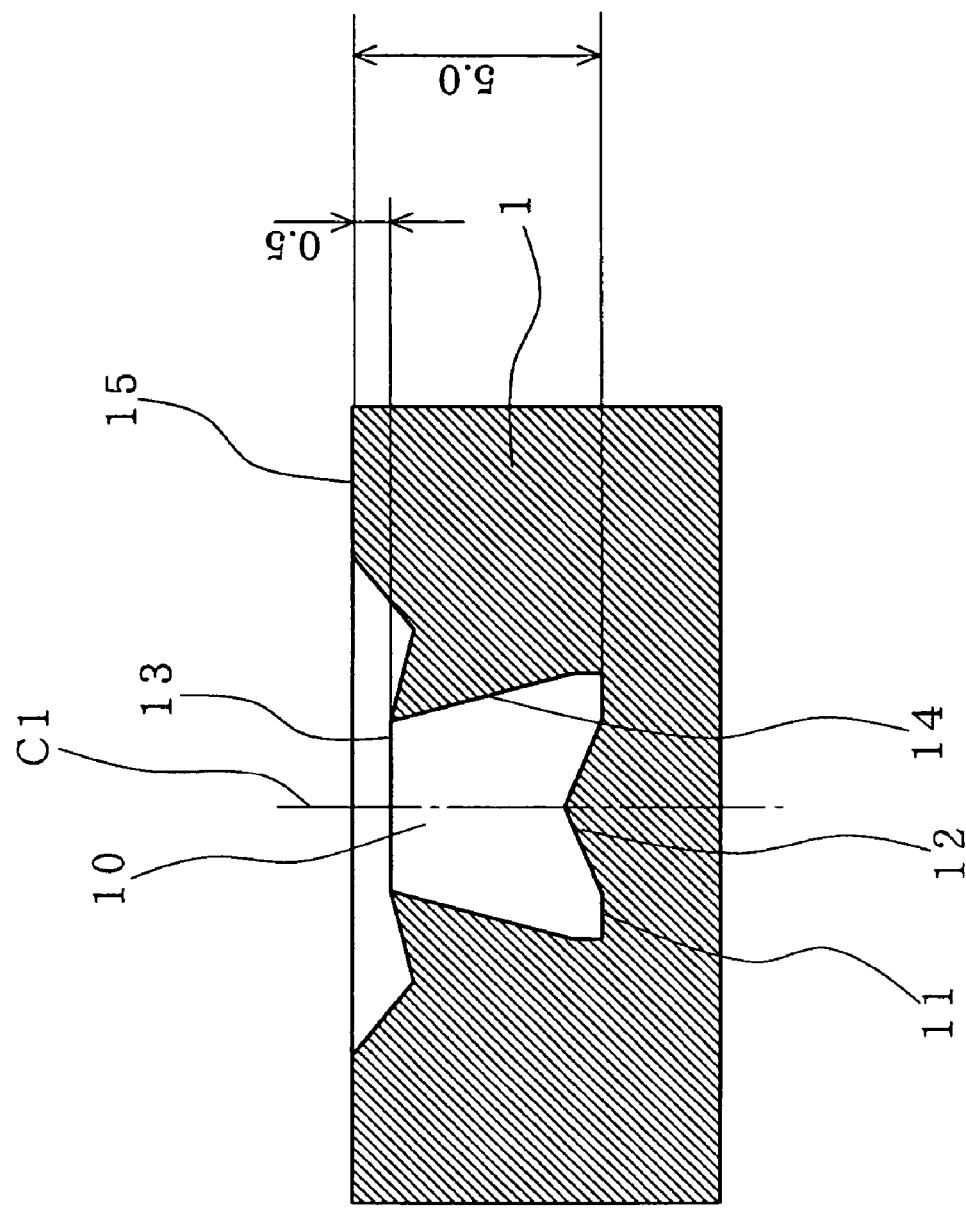
FIG. 3 is a cross sectional view illustrating a substantial part of a first member according to an embodiment of the present invention.

Next, a configuration of the first member 1 will be explained. FIG. 3 is a cross sectional view illustrating a substantial part of a first member 1. As shown in FIG. 1, the peripheral portion of the hole 10 is shown in FIG. 3.

The hole 10 provided on the first member 1 formed from the hole 30 of the unprocessed member 3 by pressing. A projecting portion 12 (derived from the projecting portion 32 of the unprocessed member 3) is formed at a bottom portion 11 of the hole 10. Namely, the projecting portion 12 projects towards an opening portion 13, and has a conical type shape with 120-degrees apex angle and is approximately 2 mm in height, and the top of the projecting portion 12 is placed on a center line C1 of the hole 10.

An inverse tapered shape is formed at an inner wall 14 of the hole 10 and narrows from a bottom portion 11 to the opening portion 13. The angle of the taper is approximately 20-degrees. The opening portion 13 is positioned approximately 0.5 mm inner side from an upper surface 15 (derived from the upper surface 35 of the unprocessed member 3). A depth of the hole 10 is approximately 4.5 mm.

FIG. 4 is a cross sectional view of a second member 2. The second member 2 has a tubular shape with one closing end 21 and an opening end 22. A flange 24 is provided at a peripheral portion of the opening end 22. A region between the flange 24 and the closing end 21 is referred to as a tube portion 23.

A distance between the under surface of the flange portion 24 and the under surface of the closing end 21 is 7 mm. This length is longer than the distance between the upper surface 15 and the bottom portion 11 of the first member 1. The second member 2 is made of high tensile steel SPH440 (shape: plate) and formed by deep-draw pressing. In this structure, a set of the closing end 21 and the tube portion 23 refers to a boss portion 25.

FIG. 5 and FIG. 6 are explanation drawings (cross sectional views) for explaining the connecting process of two parts. FIG. 5 shows a condition that the second member 2 is inserted into the hole 10 of the first member 1 (a condition before connecting). FIG. 6 shows a condition that the second member 2 is deformed to fit the hole 10 of the first member 1 (a condition after connecting).

First, the first member 1 is placed on a table of a pressing machine (not shown) wherein the opening portion 13 faces in an upward direction. Next, as shown in FIG. 5, the boss portion 25 of the second member 2 is inserted into the hole 10 of the first member 1 so as to contact the closed end 21 of the second member 2 and the bottom portion 11 of the hole 10. In practice, an upper punch 5 is used to push the flange portion 24 of the second member 2 downward in FIG. 5, and the boss portion 25 of the second member 2 is inserted into the hole 10.

Furthermore, the second member 2 is pushed to the bottom portion 11 of the hole 10 by the upper punch 5 with 78.5 kN in load. Therefore, the load is concentrated at the contacting portion of the closing end 21 and the projecting portion 12. Material forming the closing end 21 is plastically deformed into the radial direction and material forming the tube portion 23 is also plastically deformed along the inner wall 14. It follows that a connecting portion 26 is formed as shown in FIG. 6. In this condition, outer diameter of the connecting portion 26 is larger than inner diameter of the opening portion 13 of the first member 1, and first member 1 and the second member 2 are fit connected.

Since the material composing the closing end 21 is plastically deformed (plastic flow) by the projecting portion 12 which serves as a fulcrum, it is not necessary to reduce the thickness of the closing end 21. Also, since the material composing the tube portion 23 is plastically deformed (plastic flow) along the inner wall 14, the size of the connecting portion 26 may become sufficient to prevent slipping out of the tube portion 23. In addition, since the connecting portion 26 is fitted to the inner wall 14, friction resistance between the tube portion 23 and the inner wall 14 may be more sufficient to prevent slipping out the tube portion 23.

According to the present embodiment, the connecting system requires a first member including a hole with an inverse tapered inner wall and a second member including a boss portion which is longer than the depth of the hole. Therefore, this connecting structure may be applied to various connecting system if the first member is made of a plastically deformable material. Connecting strength may be increased by increasing the size of the hole. The size of the hole may be selected depending on required connecting strength of products.

Although a connecting method described in background art JP2002-364622A2 requires arranging a ring-shaped ditch and a ring-shaped projecting portion, thereby increasing the production cost, the present embodiment may not require the ring-shaped ditch and ring-shaped projecting portion.

According to the present embodiment, although the first member 1 is formed by plastic forming of the unprocessed member 3, the forming method is not limited to this method. For example, a lost-wax process, machining, casting, or sintering may be applicable. By applying the forming method of the present embodiment, the hole including the inverse tapered inner wall may be easily formed since the hole can be simply formed by plastic forming using a pressing machine.

The material comprising the first member is not limited to chromium steel. Any material can be used if the material has sufficient strength (wherein the opening portion of the hole and the projecting portion of the hole does not cause buckling when the first member is connected with the second member). For example, steel materials such as carbon steel, tool steel, titanium steel, stainless steel, and nickel steel are applicable. Heat treatment applied to these materials is preferable to strengthen the first member.

According to the present embodiment, although a forged material is used as the unprocessed member, the invention is not limited to a forged material.

According to the present embodiment, although a conical-shaped projecting portion of the first member is used, a distorted shape also may be applicable. Any other shape is applicable if the projecting portion is capable of plastically deforming the closing end of the second member in the radial direction.

According to the present embodiment, although the lower side of the punch member has a truncated conical shape having the inverted conical-shaped concave portion at the lower face of the lower side wherein the outer diameter of the inverted conical-shaped concave portion which is larger than the inner diameter of the projecting surface portion of the unprocessed member and smaller than the outer diameter of the projecting surface portion, another type of punch may be used if the punch is capable to make an inverse tapered shape at the inner wall of the hole. In particular, the projecting surface portion may be efficiently plastically deformed if the outer diameter portion of the inverted conical-shaped concave portion is set to contact to the projecting surface portion at the upper surface side.

According to the present embodiment, although the boss portion of the second member has a tubular shape, the invention is not limited to a tubular shape. Another shape, for example, a cylindrical shape (solid) or another shape may be applicable if it can plastically deform in the radial direction by the projecting portion of the first member.

According to the present embodiment, although the boss portion of the second member is formed by deep-draw pressing, another method, for example, casting may be applicable. According to the present embodiment, although high tensile steel is used as the material of the second member, the invention is not limited to high tensile steel. Another material may be applicable if the material can be deformed plastically. For example, other steel materials such as aluminum steel, carbon steel, titanium steel, stainless steel, and nickel steel may be applicable.

Although the present embodiment is explained for a case that one position is connected, two or more connecting portions may be arranged to each the first member and the second member to obtain high connecting strength against torsion force.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A method for connecting two members comprising the steps of:
    preparing a first member including a hole which has a narrower width at an opening portion than a width at a bottom portion and a projecting portion projected toward the opening portion at the bottom portion of the hole and a second member with a longer shape than a depth of the hole of the first member;
    inserting the second member into the hole of the first member; and
    inserting the second member into the bottom portion of the first member with pressure to deform the second member plastically,
    wherein the first member is shaped from an unprocessed member using a punch, the unprocessed member includes a hole with a projecting portion at a bottom portion thereof and a projecting surface portion formed along a periphery of the opening portion of the hole so as to project relative to an outer surface peripheral of the projecting surface portion, one side of the punch is shaped to a truncated cone type shape having an inverted cone shape concave portion, an outer diameter of the inverted cone shape concave portion is larger than an inner diameter of the projecting surface portion and smaller than an outer diameter of the projecting surface portion, and the first member is shaped by forging of the unprocessed member with pushing the projecting surface portion of the unprocessed member using the truncated cone side of the punch.

2. A method for connecting two members according to claim 1, wherein the projecting surface portion is shaped to a ring type shape surrounding the opening portion of the unprocessed member.

3. A method for connecting two members according to claim 1, wherein the outer peripheral of the projecting surface portion has an inclined surface portion.

4. A method for connecting two members according to claim 1, wherein the hole of the unprocessed member is shaped to a cylindrical shape.

* * * * *